(12) United States Patent
Lee et al.

(10) Patent No.: US 9,922,404 B2
(45) Date of Patent: Mar. 20, 2018

(54) INPAINTING DEVICE AND METHOD USING SEGMENTATION OF REFERENCE REGION

(71) Applicant: SK PLANET CO., LTD., Seongnam-si, Gyeonggi-do (KR)

(72) Inventors: Su-Bin Lee, Yongin-si (KR); Hyoung-Chul Shin, Seoul (KR); Ju-Hyeun Han, Seoul (KR); Byoung-Ki Jeon, Seoul (KR)

(73) Assignee: SK PLANET CO., LTD., Seongnam-si (KR)

( * ) Notice: Subject to any disclaimer, the term of this patent is extended or adjusted under 35 U.S.C. 154(b) by 168 days.

(21) Appl. No.: 14/896,888

(22) PCT Filed: Oct. 22, 2014

(86) PCT No.: PCT/KR2014/009924
§ 371 (c)(1),
(2) Date: Dec. 8, 2015

(87) PCT Pub. No.: WO2015/111826
PCT Pub. Date: Jul. 30, 2015

(65) Prior Publication Data
US 2016/0300332 A1 Oct. 13, 2016

(30) Foreign Application Priority Data
Jan. 24, 2014 (KR) .................. 10-2014-0009197

(51) Int. Cl.
*G06T 5/00* (2006.01)
*G06T 7/11* (2017.01)

(52) U.S. Cl.
CPC ............ *G06T 5/005* (2013.01); *G06T 7/11* (2017.01)

(58) Field of Classification Search
None
See application file for complete search history.

(56) References Cited

U.S. PATENT DOCUMENTS

2004/0164996 A1  8/2004  Criminisi et al.
2008/0238942 A1 10/2008  Sun et al.
(Continued)

FOREIGN PATENT DOCUMENTS

KR  1020100088282 A  8/2010
KR  1020110046904 A  5/2011
(Continued)

OTHER PUBLICATIONS

Subin Lee et al., Image Inpainting by Band Matching, Seamless Cloning and Area Sub-Division, Journal of Korea Multimedia Society, Feb. 2008, pp. 153-162, vol. 11, No. 2.
(Continued)

*Primary Examiner* — Nicholas R Wilson
(74) *Attorney, Agent, or Firm* — Hauptman Ham, LLP

(57) ABSTRACT

An inpainting device and method using the segmentation of a reference region are disclosed. An inpainting device using the segmentation of a reference region includes a region determination unit configured to determine an inpainting target region and a reference region within video image content, an inpainting group setting unit configured to set inpainting groups using pixel values within the reference region; an inpainting unit configured to perform segmentation inpainting adapted to perform inpainting on a segmented target region using the segmented reference region on an inpainting group basis and non-segmentation inpainting adapted to perform inpainting on the target region using the reference region, and an information provision unit configured to visually provide the result of the segmentation inpainting, the result of the non-segmentation inpainting, and information about the difference between the results of the segmentation inpainting and the non-segmentation inpainting to the user.

17 Claims, 8 Drawing Sheets

(56) References Cited

U.S. PATENT DOCUMENTS

| | | |
|---|---|---|
| 2011/0103706 A1 | 5/2011 | Jeong et al. |
| 2012/0001902 A1 | 1/2012 | Lee et al. |
| 2012/0224781 A1* | 9/2012 | Tai .................... G06T 5/005 382/254 |
| 2013/0083965 A1 | 4/2013 | Joung et al. |
| 2013/0182184 A1 | 7/2013 | Senlet et al. |
| 2013/0266208 A1 | 10/2013 | Lim et al. |
| 2014/0112548 A1* | 4/2014 | Huang .................... G06T 5/005 382/108 |

FOREIGN PATENT DOCUMENTS

| | | |
|---|---|---|
| KR | 1020120003232 A | 1/2012 |
| KR | 1020120014876 A | 2/2012 |
| KR | 1020130036514 A | 4/2013 |
| KR | 1020130056407 A | 5/2013 |

OTHER PUBLICATIONS

International Search Report for PCTKR2014/009924 dated Jan. 16, 2015.

* cited by examiner

INPAINTING DEVICE AND METHOD USING SEGMENTATION OF REFERENCE REGION

CROSS REFERENCE TO RELATED APPLICATION

The present invention claims the benefits of the filing date of Korean Patent Application No. 10-2014-0009197 filed on Jan. 24, 2014, in the Korean Patent and Trademark Office. Further, this application is the National Phase application of International Application No. PCT/KR2014/009924 filed on Oct. 22, 2014, the content of which is incorporated herein in its entirety.

TECHNICAL FIELD

The present invention relates to an inpainting device and method using the segmentation of a reference region, and more particularly to an inpainting device and method using the segmentation of a reference region that can perform inpainting without segmenting an inpainting region and after segmenting an inpainting region in multiple stages and that can provide information about the difference between the results of respective types of inpainting to the user.

BACKGROUND ART

With the development of digital signal processing technology, virtual advertising that inserts a virtual image into a video has been popularized, and indirect advertising has established itself as an effective advertising means. Accordingly, interest has been rapidly increasing in virtual indirect advertising that combines a virtual advertisement with an indirect advertisement and naturally inserts an advertisement image into a previously generated video.

In connection with virtual indirect advertising, inpainting technology that naturally inserts a virtual image into a previously generated video or that eliminates part of an image of a previously generated video and performs natural restoration to achieve harmonization with a background is fundamental.

In inpainting technology, a reference region to be used for restoration is required to restore a target region. When a reference region is designated in a non-limiting manner, as in a case where the reference region is designated as an overall video frame, a problem arises in that computational load rapidly increases. When overall inpainting is performed regardless of the correction between a reference region and a region to be restored even when the reference region is limited, a problem arises in that an unintentional inpainting result occurs.

Accordingly, there is a growing need for new inpainting technology that performs inpainting without segmenting an inpainting region and after segmenting an inpainting region in multiple stages and that provides information about the difference between the results of respective types of inpainting to the user, thereby overcoming a problem in which an awkward inpainting result occurs when inpainting is performed in a single mode.

Related preceding technology includes Korean Patent Application Publication No. 10-2013-0056407 published on May 30, 2013 (entitled "Inpainting System and Method for H.264 for Error Concealment Image").

DISCLOSURE

Technical Problem

An object of the present invention is to perform inpainting without segmenting an inpainting region and after segmenting an inpainting region in multiple stages and provide information about the difference between the results of respective types of inpainting to the user, thereby overcoming a problem in which an awkward inpainting result occurs when inpainting is performed in a single mode.

Furthermore, an object of the present invention is to provide various types of inpainting result information to a user, receive feedback from the user, and incorporate the feedback into a final inpainting result, thereby performing more natural inpainting.

Technical Solution

In order to accomplish the above objects, the present invention provides an inpainting device using the segmentation of a reference region, including: a region determination unit configured to determine an inpainting target region present within video image content and a reference region composed of pixels present within a preset distance from the boundary pixels of the inpainting target region; an inpainting group setting unit configured to set inpainting groups composed of respective pairs of segmented reference regions obtained by segmenting the reference region using pixel values within the reference region and segmented target regions obtained by segmenting the target region so as to correspond to the segmented reference region; an inpainting unit configured to perform segmentation inpainting adapted to perform inpainting on a segmented target region using the segmented reference region on an inpainting group basis, and non-segmentation inpainting adapted to perform inpainting on the target region using the reference region; and an information provision unit configured to visually provide the result of the segmentation inpainting, the result of the non-segmentation inpainting, and information about the difference between the results of the segmentation inpainting and the non-segmentation inpainting to the user.

In this case, the inpainting group setting unit may further include a group set generation unit configured to differently generate group sets based on the number of inpainting groups; and the group set generation unit may generate a first group set in which the number of inpainting groups has been set to the first number of segmentations and generate a second group set in which the number of inpainting groups has been set to the second number of segmentations different from the first number of segmentations.

In this case, the segmentation inpainting may include first segmentation inpainting adapted to be performed on the first group set and second segmentation inpainting adapted to be performed on the second group set.

In this case, the result of the segmentation inpainting may include the results of the first segmentation inpainting and the second segmentation inpainting.

In this case, the information provision unit may further visually display information about the difference between the results of the first segmentation inpainting and the second segmentation inpainting.

In this case, the group set generation unit additionally may generate the second group set in which the number of inpainting groups is equal to or smaller than the reference number of groups when the number of inpainting groups of the first group set exceeds the preset reference number of groups.

In this case, the group set generation unit may generate the second segmentation set by merging any two or more of the inpainting groups of the first group set when the first number of segmentations exceeds the preset reference number of segmentations.

In this case, the inpainting group setting unit may calculate the edge values of pixels within the reference region, may determine whether a variation in edge values is below a preset reference variation, and may group the pixels within the reference region and set the grouped pixels as the segmented reference region based on the result of the determination.

In this case, the inpainting group setting unit may determine whether the variation in edge values is below the preset reference variation, and may group the pixels within the reference region and set the grouped pixels as the segmented reference region based on the result of the determination.

In this case, the inpainting group setting unit may determine whether the pixel values within the reference region fall within a preset range of values similar to a reference pixel value, and may set pixels falling within the similar range as an identical inpainting group.

In this case, the inpainting group setting unit may segment the target region using the pattern of the segmentation boundary line of the reference region.

Furthermore, the present invention provides an inpainting method using the segmentation of a reference region, including: determining an inpainting target region present within video image content and a reference region composed of pixels present within a preset distance from the boundary pixels of the inpainting target region; setting inpainting groups composed of respective pairs of segmented reference regions obtained by segmenting the reference region using pixel values within the reference region and segmented target regions obtained by segmenting the target region so as to correspond to the segmented reference region; performing segmentation inpainting adapted to perform inpainting on a segmented target region using the segmented reference region on an inpainting group basis and non-segmentation inpainting adapted to perform inpainting on the target region using the reference region; and visually providing the result of the segmentation inpainting, the result of the non-segmentation inpainting, and information about the difference between the results of the segmentation inpainting and the non-segmentation inpainting to the user.

In this case, setting the inpainting groups may further include differently generating group sets based on the number of inpainting groups; generating the group sets may include generating a first group set in which the number of inpainting groups has been set to the first number of segmentations and generating a second group set in which the number of inpainting groups has been set to the second number of segmentations different from the first number of segmentations.

In this case, the segmentation inpainting may include first segmentation inpainting adapted to be performed on the first group set and second segmentation inpainting adapted to be performed on the second group set.

In this case, the result of the segmentation inpainting may include the results of the first segmentation inpainting and the second segmentation inpainting.

In this case, providing the information about the difference may include further visually displaying information about the difference between the results of the first segmentation inpainting and the second segmentation inpainting.

In this case, generating the group sets may include additionally generating the second group set in which the number of inpainting groups is equal to or smaller than the reference number of groups when the number of inpainting groups of the first group set exceeds the preset reference number of groups.

In this case, generating the group sets may include generating the second segmentation set by merging any two or more of the inpainting groups of the first group set when the first number of segmentations exceeds the preset reference number of segmentations.

Advantageous Effects

According to the present invention, inpainting is performed without segmenting an inpainting region and after segmenting an inpainting region in multiple stages, and information about the difference between the results of respective types of inpainting is provided to the user, thereby overcoming a problem in which an awkward inpainting result occurs when inpainting is performed in a single mode.

Furthermore, according to the present invention, various types of inpainting result information are provided to a user, feedback is received from the user, and the feedback is incorporated into a final inpainting result, thereby performing more natural inpainting.

MODE FOR INVENTION

Figure 1:
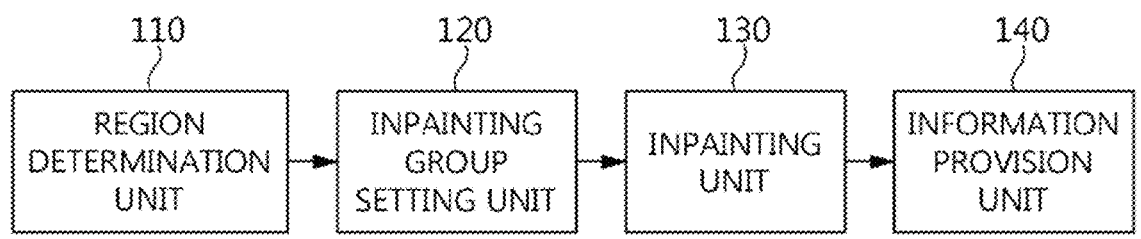
FIG. 1 is a block diagram showing an inpainting device using the segmentation of a reference region according to an embodiment of the present invention.

Preferred embodiments of the present invention will be described in detail below with reference to the accompanying drawings. However, detailed descriptions of well-known functions and configurations that may make the gist of the present invention unnecessarily obscure will be omitted in the following description and the attached drawings. Furthermore, it should be noted that the same components are designated by the same reference symbols throughout the drawings as much as possible.

The terms and words used in the following specification and the claims should not be restrictively interpreted as having common and dictionary meanings, but should be interpreted as having meanings and concepts in conformity with the technical spirit of the present invention based on the principle that an inventor can appropriately define the concepts of terms in order to describe his or her invention in the best way. Accordingly, since the embodiments described in the present specification and the configurations shown in the drawings merely correspond to the preferred embodiments of the present invention and do not cover all the technical spirit of the present invention, it should be appreciated that there may be various equivalents and modifications that may replace the configurations at the time at which the present application is filed. Furthermore, the terms "first," "second" and so on are used to describe various components, and are intended to distinguish one component from other components but are not intended to limit these components.

An inpainting device using the segmentation of a reference region according to an embodiment of the present invention is described below.

FIG. 1 is a block diagram showing an inpainting device using the segmentation of a reference region according to an embodiment of the present invention.

Referring to FIG. 1, the inpainting device using the segmentation of a reference region according to the embodiment of the present invention includes a region determination unit 110, an inpainting group setting unit 120, an inpainting unit 130, and an information provision unit 140.

The region determination unit 110 determines an inpainting target region present within video image content and a reference region composed of pixels present within a preset distance from the boundary pixels of the inpainting target region.

In this case, the inpainting target region refers to a region on which inpainting will be performed within the video image content.

In this case, the inpainting target region may be determined by the input of a user.

The inpainting group setting unit 120 sets inpainting groups composed of respective pairs of segmented reference regions obtained by segmenting the reference region using pixel values within the reference region and segmented target regions obtained by segmenting the target region so as to correspond to the segmented reference region.

In this case, the inpainting group setting unit 120 may calculate the edge values of pixels within the reference region, may determine whether a variation in edge values is below a preset reference variation, and may group the pixels within the reference region and set the grouped pixels as the segmented reference region based on the result of the determination.

In this case, the inpainting group setting unit 120 may determine whether the variation in edge values is below the preset reference variation, and may group the pixels within the reference region and set the grouped pixels as the segmented reference region based on the result of the determination.

In this case, the reference variation may be a reference value that is preset so as to determine pixels having large variations in edge values among the pixels within the reference region.

In this case, the inpainting group setting unit 120 may determine whether the pixel values within the reference region fall within a preset range of values similar to a reference pixel value, and may set pixels falling within the similar range as the same inpainting group.

In this case, the reference pixel value may be a reference value that is preset so as to determine pixels having similar pixel values among the pixels within the reference region.

In this case, the reference pixel value may be a reference value that is preset to a pixel value having a predetermined or higher distribution using a distribution histogram of pixel values.

In this case, the inpainting group setting unit 120 may segment the target region using the pattern of the segmentation boundary line of the reference region.

For example, the inpainting group setting unit 120 may segment the target region into rectilinear patterns when the segmentation boundary line of the reference region is a rectilinear pattern, and may also segment the target region into zigzag patterns when the segmentation boundary line of the reference region is a zigzag pattern.

In this case, the inpainting group setting unit 120 may include a group set generation unit configured to differently generate group sets based on the number of inpainting groups.

In this case, the group set is a set in which a method of segmenting the same target region and reference region in various manners has been set.

In this case, the group set generation unit may generate a first group set in which the number of inpainting groups has been set to the first number of segmentations, and may generate a second group set in which the number of inpainting groups has been set to the second number of segmentations different from the first number of segmentations.

For example, the group set generation unit may generate a first group set in which the number of inpainting groups has been set to 2 segmentations and a second group set in which the number of inpainting groups has been set to 3 segmentations.

In this case, the group set generation unit may additionally generate a second group set in which the number of inpainting groups is equal to or smaller than the reference number of groups when the number of inpainting groups of the first group set exceeds the preset reference number of groups.

In this case, the reference number of groups may be the upper limit value of the number of inpainting groups that is preset so as to limit segmentation into an excessively large number of inpainting groups.

For example, the group set generation unit may additionally generates a second group set in which the number of inpainting groups is equal to or smaller than 6 when the number of inpainting groups of the first group set exceeds 6, i.e., the preset reference number of groups.

In this case, the group set generation unit may generate the second segmentation set by merging any two or more of the inpainting groups of the first group set when the first number of segmentations exceeds the preset reference number of segmentations.

For example, the group set generation unit may generate a second group set having a total of 6 inpainting groups by merging any two of the inpainting groups of the first group set when the reference number of groups is 6 and the number of inpainting groups of the first group set is 7.

In this case, the group set generation unit may merge groups in which the representative pixel values of respective inpainting groups are similar.

The inpainting unit 130 performs segmentation inpainting adapted to perform inpainting on a segmented target region using the segmented reference region on an inpainting group basis, and non-segmentation inpainting adapted to perform inpainting on a target region using the reference region.

In this case, the non-segmentation inpainting is inpainting that is performed without segmenting the reference region and the target region.

In this case, the segmentation inpainting may include first segmentation inpainting adapted to be performed on the first group set, and second segmentation inpainting adapted to be performed on the second group set.

In this case, the result of the segmentation inpainting may include the result of the first segmentation inpainting and the result of the second segmentation inpainting.

The information provision unit 140 visually provides the result of the segmentation inpainting, the result of the non-segmentation inpainting, and information about the difference between the results of the segmentation inpainting and the non-segmentation inpainting to the user.

In this case, the information provision unit may further visually display information about the difference between the results of the first segmentation inpainting and the second segmentation inpainting.

As described above, the inpainting device using the segmentation of a reference region according to the embodiment of the present invention may perform inpainting without segmenting the inpainting region and after segmenting the inpainting region in multiple stages, and may provide information about the difference between the results of respective types of inpainting to the user. Furthermore, more natural inpainting can be performed by providing various types of inpainting result information to the user, receiving feedback from the user and incorporating the feedback into a final inpainting result.

The determination of regions according to an embodiment of the present invention is described below.

Figure 2:
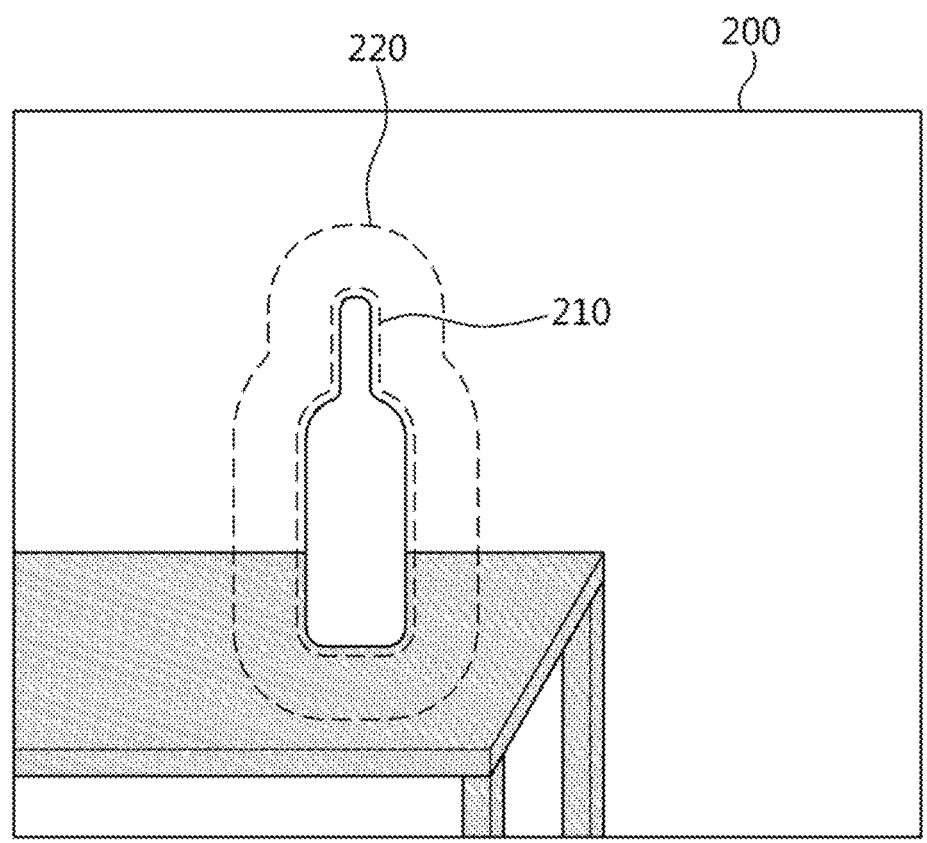
FIG. 2 is a diagram showing an example of the step of determining a target region and a reference region according to the present invention.

FIG. 2 is a diagram showing an example of the step of determining a target region and a reference region according to the present invention.

Referring to FIG. 2, at the step of determining a target region and a reference region according to the present invention according to the present invention, a region of pixels corresponding to a target on which inpainting will be performed within a video image frame 200 is determined, and a region of pixels which are referred to during inpainting.

It can be seen that the pixels corresponding to a target on which inpainting will be performed are pixels within a target region and pixels inside a target region boundary line 210.

It can be seen that the pixels which are referred to during inpainting are pixels between the target region boundary line 210 and a reference region boundary line 220 that is a preset distance away from the target region boundary line 210 in an outward direction.

In this case, the inpainting target region or target region boundary line 210 may be determined by the input of the user.

The setting of inpainting groups according to an embodiment of the present invention is described below.

FIGS. 3 to 6 are diagrams showing an example of the step of setting inpainting groups according to the present invention.

FIGS. 3 to 6 show only the target region and reference region of FIG. 2. Inpainting groups are sets in a sequence from FIG. 3 to FIG. 6.

Figure 3:
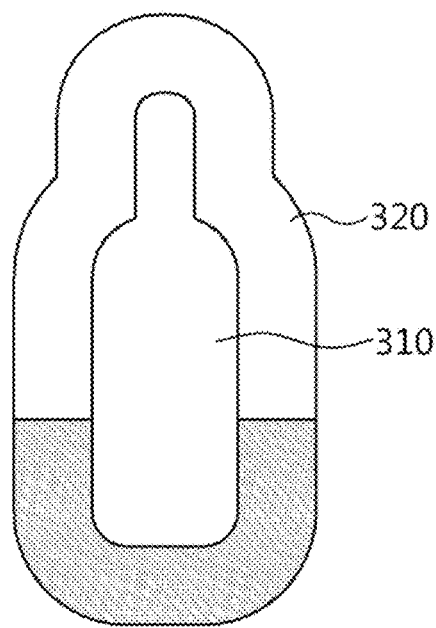
FIGS. 3 to 6 are diagrams showing an example of the step of setting inpainting groups according to the present invention.

Referring to FIG. 3, it can be seen that the step of setting inpainting groups according to the present invention is directed to only the target region 310 and the reference region 320.

Figure 4:
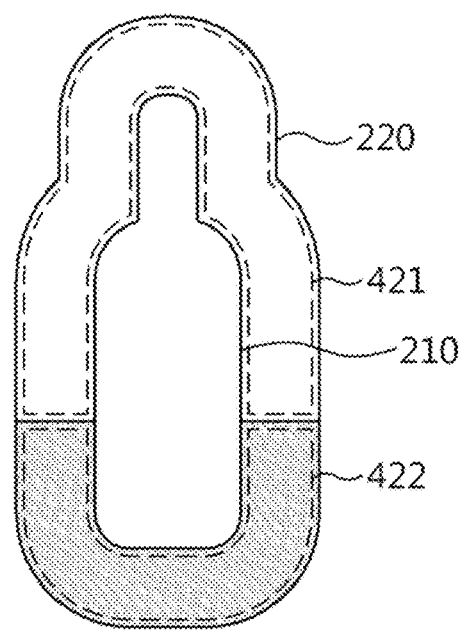

Referring to FIG. 4, at the step of setting inpainting groups according to the present invention, the reference region 320 is segmented using pixel values within the reference region 320.

That is, at the step of setting inpainting groups according to the present invention, a region corresponding to a portion outside a desk in FIG. 2 is set as a first segmented reference region 421, and a region corresponding to a portion inside the desk is set as a second segmented reference region 422 using pixel values within the reference region 320.

In this case, at the step of setting inpainting groups according to the present invention, it may be determined whether the pixel values within the reference region 320 fall within a preset range of values similar to a reference pixel value, and pixels falling within the range of similar values may be set as the same segmented reference region.

In this case, the reference pixel value may be a reference value that is preset so as to determine pixels having similar pixel values among pixels within the reference region.

For example, when the pixels corresponding to the portion outside the desk in FIG. 4 fall within a range of values similar to a reference pixel value for the portion outside the desk, a region corresponding to the portion outside the desk may be set as the first segmented reference region 421.

In this case, the reference pixel value may be a reference value that is preset to a pixel value having a predetermined or higher distribution using a distribution histogram of pixel values.

For example, in FIG. 4, when the value that is preset to a pixel value having a predetermined or higher distribution is determined to be the reference pixel value using a distribution histogram of pixel values, the reference pixel value may include any one of the pixel values of the portion outside the desk and any one of the pixel values of the portion inside the desk.

In this case, at the step of setting inpainting groups according to the present invention, the edge values of the pixels within the reference region 320 may be calculated, it may be determined whether a variation in edge values is below a preset reference variation, and the reference region may be segmented based on the result of the determination.

In this case, the reference variation may be a reference value that is preset so as to determine pixels having large variations in edge values among the pixels within the reference region.

For example, in FIG. 4, when the edge values of the boundary lines of the portion outside the desk and a portion below the desk are above the reference variation, a region corresponding to the portion outside the desk may be set as the first segmented reference region 421, and a region corresponding to the portion inside the desk may be set as the second segmented reference region 422.

Figure 5:
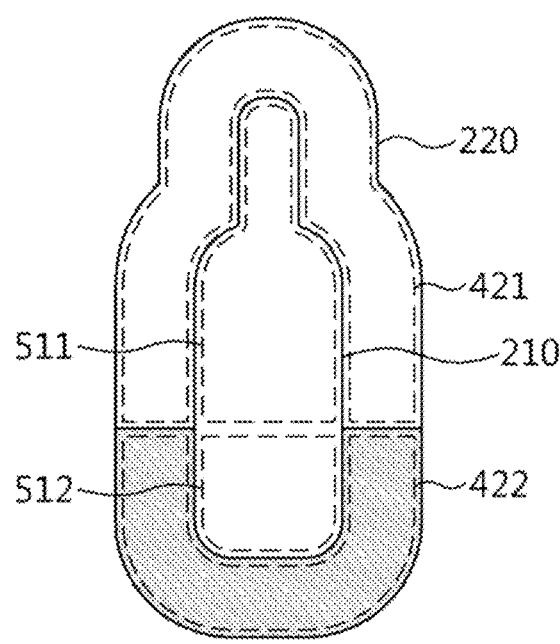

Referring to FIG. 5, at the step of setting inpainting groups according to the present invention, the target region 310 is segmented so as to correspond to the segmented reference regions 421 and 422.

In this case, at the step of setting inpainting groups according to the present invention, the target region 310 may be segmented using the pattern of a boundary line between the segmented reference regions 421 and 422.

For example, at the step of setting inpainting groups according to the present invention, when the boundary line between the segmented reference regions 421 and 422 is a rectilinear pattern, the target region 310 may be segmented into segmented target regions 511 and 512 having a boundary line based on the rectilinear pattern.

That is, at the step of setting inpainting groups according to the present invention, when a boundary line between the segmented reference regions 421 and 422 has a zigzag pattern, the target region 310 may be segmented into the segmented target regions 511 and 512 having a boundary line based on the zigzag pattern.

Figure 6:
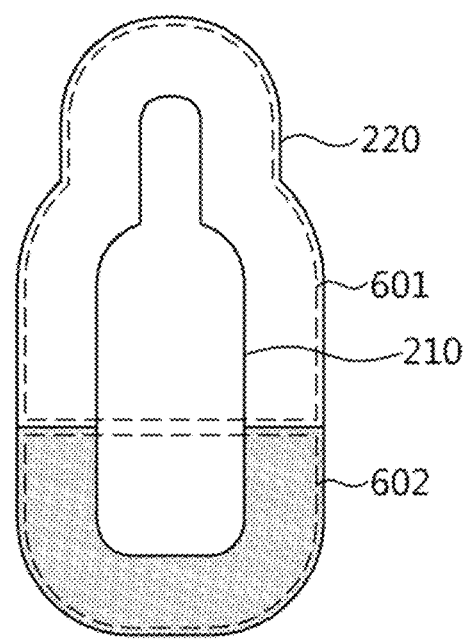

Referring to FIG. 6, at the step of setting inpainting groups according to the present invention, inpainting groups 601 and 602 composed of respective pairs of the segmented reference regions 421 and 422 and the segmented target regions 511 and 512 corresponding to the segmented reference regions 421 and 422, respectively, are set.

For example, at the step of setting inpainting groups according to the present invention, when the segmented reference region 421 and segmented target region 511 corresponding to each other, the inpainting group 601 composed of a pair of the segmented reference region 421 and segmented target region 511 may be set.

That is, as described in the series of descriptions of FIGS. 3 to 6, at the step of setting inpainting groups according to the present invention, it can be seen that the reference region 320 is segmented, the target region 310 is segmented accordingly, and the inpainting groups 601 and 602 of respective pairs of the segmented reference region 421 and 422 and the segmented target region 511 and 512 corresponding to the segmented reference region 421 and 422, respectively, are set.

The generation of group sets according to an embodiment of the present invention is described below.

Figure 7:
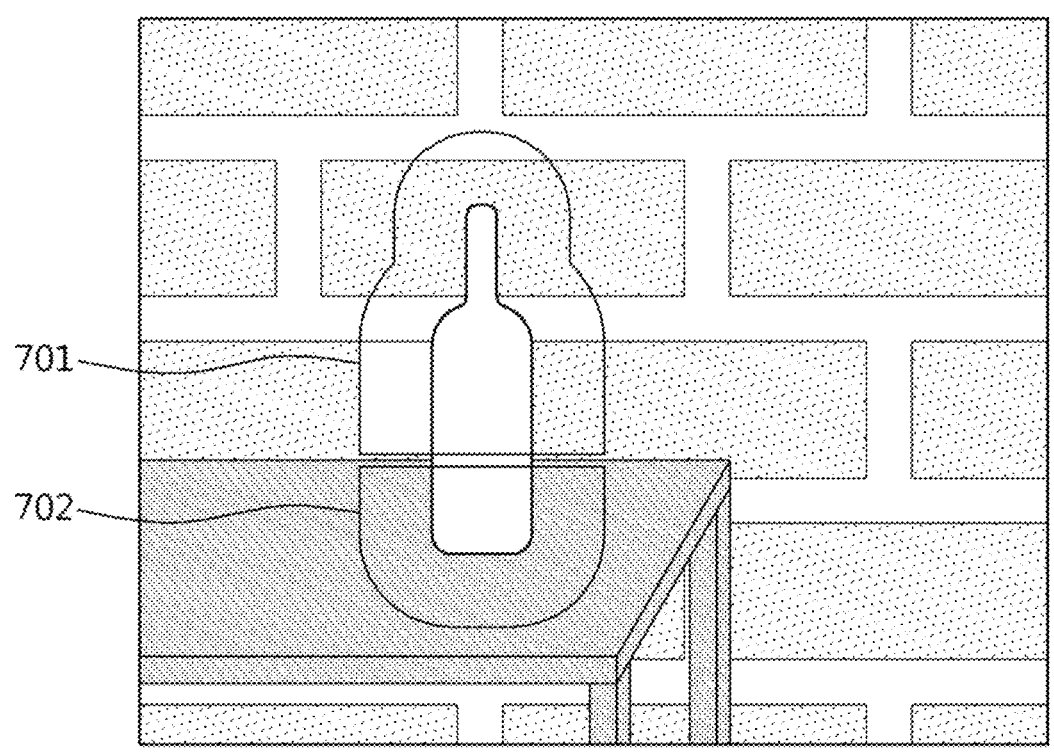
FIGS. 7 and 8 are diagrams showing an example of the step of generating group sets according to the present invention.
Figure 8:
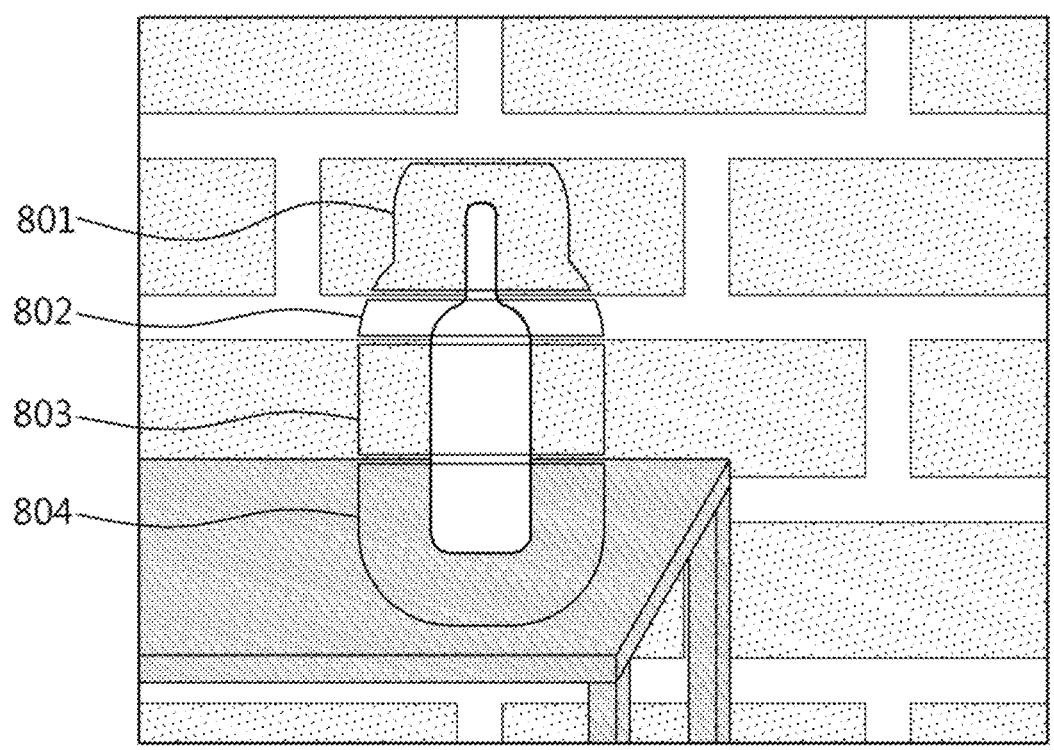

FIGS. 7 and 8 are diagrams showing an example of the step of generating group sets according to the present invention.

FIG. 7 shows a first group set in which a total of 2 inpainting groups have been set, and FIG. 8 shows a second group set in which a total of 4 inpainting groups have been set.

At the step of generating group sets according to the present invention, group sets may be differently generated based on the number of inpainting groups.

In this case, the group set is a set in which a method of segmenting the same target region and reference region in various manners has been set.

Referring to FIG. 7, it can be seen that a first inpainting group 701 corresponding to a portion outside a desk and a second inpainting group 702 corresponding to a portion inside the desk have been set as a first group set.

Referring to FIG. 8, it can be seen that inpainting groups 801 to 803 based on the colors of a background in a portion outside a desk and a fourth inpainting group 804 in a portion inside the desk have been set as a second group set.

As described above, it can be seen that, at the step of generating group sets according to the present invention, various inpainting group settings that are generated when the reference value, such as a similar pixel value range, varies at the step of setting inpainting groups may be generated as respective group sets.

An inpainting method using the segmentation of a reference region according to an embodiment of the present invention is described below.

Figure 9:
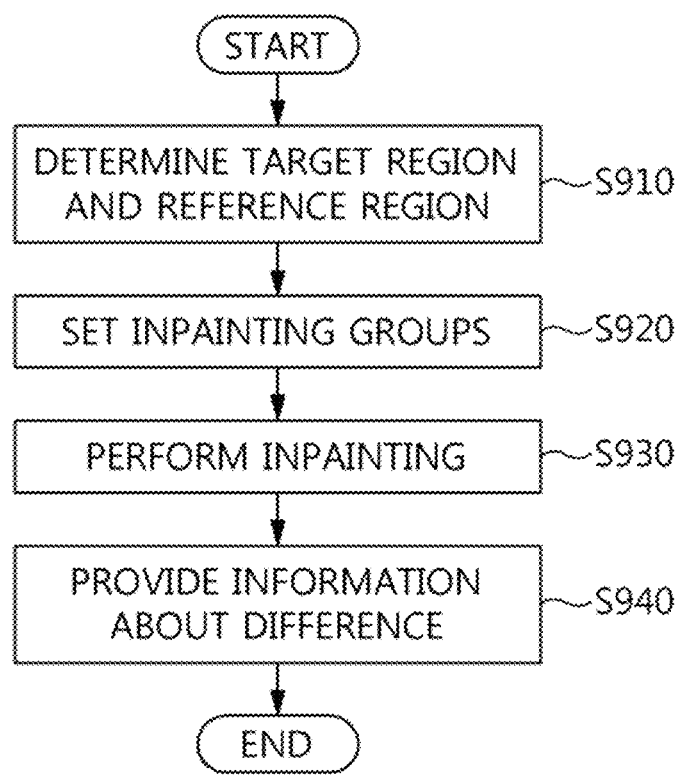
FIG. 9 is an operation flowchart showing an inpainting method using the segmentation of a reference region according to an embodiment of the present invention.

FIG. 9 is an operation flowchart showing an inpainting method using the segmentation of a reference region according to an embodiment of the present invention.

Referring to FIG. 9, in the inpainting method using the segmentation of a reference region according to the embodiment of the present invention, an inpainting target region present within video image content and a reference region composed of pixels present within a preset distance from the boundary pixels of the inpainting target region are determined at step S910.

In this case, the inpainting target region refers to a region on which inpainting will be performed within the video image content.

In this case, the inpainting target region may be determined by the input of a user.

Furthermore, in the inpainting method using the segmentation of a reference region according to the embodiment of the present invention, inpainting groups composed of respective pairs of segmented reference regions obtained by segmenting the reference region using pixel values within the reference region and segmented target regions obtained by segmenting the target region so as to correspond to the segmented reference region are set at step S920.

In this case, at step S920, the edge values of pixels within the reference region may be calculated, it may be determined whether a variation in edge values is below a preset reference variation, and the pixels within the reference region may be grouped and set as the segmented reference region based on the result of the determination.

In this case, at step S920, it may be determined whether the variation in edge values is below the preset reference variation, and the pixels within the reference region may be grouped and set as the segmented reference region based on the result of the determination.

In this case, the reference variation may be a reference value that is preset so as to determine pixels having large variations in edge values among the pixels within the reference region.

In this case, at step S920, it may be determined whether the pixel values within the reference region fall within a preset range of values similar to a reference pixel value, and pixels falling within the similar range may be set as the same inpainting group.

In this case, the reference pixel value may be a reference value that is preset so as to determine pixels having similar pixel values among the pixels within the reference region.

In this case, the reference pixel value may be a reference value that is preset to a pixel value having a predetermined or higher distribution using a distribution histogram of pixel values.

In this case, at step S920, the target region may be segmented using the pattern of the segmentation boundary line of the reference region.

For example, at step S920, the target region may be segmented into rectilinear patterns when the segmentation boundary line of the reference region is a rectilinear pattern, and the target region may be also segmented into zigzag patterns when the segmentation boundary line of the reference region is a zigzag pattern.

In this case, step S920 may further include the step of differently generating group sets based on the number of inpainting groups.

In this case, the group set is a set in which a method of segmenting the same target region and reference region in various manners has been set.

In this case, at the step of generating group sets, a first group set in which the number of inpainting groups has been set to the first number of segmentations may be generated, and a second group set in which the number of inpainting groups has been set to the second number of segmentations different from the first number of segmentations may be generated.

For example, at the step of generating group sets, a first group set in which the number of inpainting groups has been set to 2 segmentations may be generated, and a second group set in which the number of inpainting groups has been set to 3 segmentations may be generated.

In this case, at the step of generating group sets, when the number of inpainting groups of the first group set exceeds the preset reference number of groups, a second group set in which the number of inpainting groups is equal to or smaller than the reference number of groups may be additionally generated.

In this case, the reference number of groups may be the upper limit value of the number of inpainting groups that is preset so as to limit segmentation into an excessively large number of inpainting groups.

For example, at the step of generating group sets, when the number of inpainting groups of the first group set exceeds 6, i.e., the preset reference number of groups, a second group set in which the number of inpainting groups is equal to or smaller than 6 may be additionally generated.

In this case, at the step of generating group sets, when the first number of segmentations exceeds the preset reference number of segmentations, the second segmentation set may be generated by merging any two or more of the inpainting groups of the first group set.

For example, at the step of generating group sets, when the reference number of groups is 6 and the number of inpainting groups of the first group set is 7, a second group set having a total of 6 inpainting groups may be generated by merging any two of the inpainting groups of the first group set.

In this case, at the step of generating group sets, groups in which the representative pixel values of respective inpainting groups are similar may be merged.

Furthermore, in the inpainting method using the segmentation of a reference region according to the embodiment of the present invention, segmentation inpainting adapted to perform inpainting on a segmented target region using the segmented reference region on an inpainting group basis is performed, and non-segmentation inpainting adapted to perform inpainting on a target region using the reference region is performed at step S930.

In this case, the non-segmentation inpainting is inpainting that is performed without segmenting the reference region and the target region.

In this case, the segmentation inpainting may include first segmentation inpainting adapted to be performed on the first group set, and second segmentation inpainting adapted to be performed on the second group set.

In this case, the result of the segmentation inpainting may include the result of the first segmentation inpainting and the result of the second segmentation inpainting.

Furthermore, in the inpainting method using the segmentation of a reference region according to the embodiment of the present invention, the result of the segmentation inpainting, the result of the non-segmentation inpainting, and information about the difference between the results of the segmentation inpainting and the non-segmentation inpainting are visually provided to the user.

In this case, at step S540, information about the difference between the results of the first segmentation inpainting and the second segmentation inpainting may be further visually displayed.

As described above, in the inpainting method using the segmentation of a reference region according to the embodiment of the present invention, inpainting may be performed without segmenting the inpainting region and after segmenting the inpainting region in multiple stages, and information about the difference between the results of respective types of inpainting may be provided to the user. Furthermore, more natural inpainting can be performed by providing various types of inpainting result information to the user, receiving feedback from the user and incorporating the feedback into a final inpainting result.

The steps shown in FIG. 9 may be performed in the sequence shown in FIG. 9, in a sequence reverse to the former sequence, or concurrently.

The inpainting method using the segmentation of a reference region according to the present invention may be implemented as a program or smart phone app that can be executed by various computer means. In this case, the program or smart phone app may be recorded on a computer-readable storage medium. The computer-readable storage medium may include program instructions, data files, and data structures solely or in combination. Program instructions recorded on the storage medium may have been specially designed and configured for the present invention, or may be known to or available to those who have ordinary knowledge in the field of computer software. Examples of the computer-readable storage medium include all types of hardware devices specially configured to record and execute program instructions, such as magnetic media, such as a hard disk, a floppy disk, and magnetic tape, optical media, such as compact disk (CD)-read only memory (ROM) and a digital versatile disk (DVD), magneto-optical media, such as a floptical disk, ROM, random access memory (RAM), and flash memory. Examples of the program instructions include machine code, such as code created by a compiler, and high-level language code executable by a computer using an interpreter. These hardware devices may be configured to operate as one or more software modules in order to perform the operation of the present invention, and the vice versa.

The inpainting device and method using the segmentation of a reference region according to the present invention are not limited to the configurations and methods of the above-described embodiments, but some or all of the embodiments may be configured to be selectively combined such that the embodiments can be modified in various manners.

INDUSTRIAL APPLICABILITY

According to the present invention, inpainting is performed without segmenting an inpainting region and after segmenting an inpainting region in multiple stages, and information about the difference between the results of respective types of inpainting is provided to the user, thereby overcoming a problem in which an awkward inpainting result occurs when inpainting is performed in a single mode. In particular, when the trend in which interest in virtual indirect advertising that increases an advertising effect by inserting an image of an advertising item into a drama or sports broadcast has been increasing in line with a recent increase in the scale of the advertising market and the fact that inpainting technology that naturally inserts a virtual image into a previously generated video or that eliminates part of an image of a previously generated video and performs natural restoration to achieve harmonization with a background is fundamental are taken into consideration, the utilization of the inpainting device and method using the segmentation of a reference region according to the present invention will be high.

The invention claimed is:

1. An inpainting device using segmentation of a reference region, comprising:
   a region determination unit configured to determine an inpainting target region present within video image content and a reference region composed of pixels present within a preset distance from boundary pixels of the inpainting target region;
   an inpainting group setting unit configured to set inpainting groups composed of respective pairs of segmented reference regions obtained by segmenting the reference region using pixel values within the reference region and segmented target regions obtained by segmenting the target region so as to correspond to the segmented reference region;
   an inpainting unit configured to perform segmentation inpainting adapted to perform inpainting on a segmented target region using the segmented reference region on an inpainting group basis, and non-segmentation inpainting adapted to perform inpainting on the target region using the reference region; and
   an information provision unit configured to visually provide a result of the segmentation inpainting, a result of the non-segmentation inpainting, and information about a difference between the results of the segmentation inpainting and the non-segmentation inpainting to the user, wherein the inpainting group setting unit further comprises a group set generation unit configured to differently generate group sets based on a number of inpainting groups, and wherein the group set generation unit generates a first group set in which the number of inpainting groups has been set to a first number of segmentations, and generates a second group set in which the number of inpainting groups has been set to a second number of segmentations different from the first number of segmentations.

2. The inpainting device of claim 1, wherein the segmentation inpainting comprises first segmentation inpainting adapted to be performed on the first group set and second segmentation inpainting adapted to be performed on the second group set.

3. The inpainting device of claim 2, wherein the result of the segmentation inpainting comprises results of the first segmentation inpainting and the second segmentation inpainting.

4. The inpainting device of claim 3, wherein the information provision unit further visually displays information about a difference between the results of the first segmentation inpainting and the second segmentation inpainting.

5. The inpainting device of claim 4, wherein the group set generation unit additionally generates the second group set in which the number of inpainting groups is equal to or smaller than a reference number of groups when a number of inpainting groups of the first group set exceeds the preset reference number of groups.

6. The inpainting device of claim 5, wherein the group set generation unit generates the second segmentation set by merging any two or more of the inpainting groups of the first group set when the first number of segmentations exceeds a preset reference number of segmentations.

7. The inpainting device of claim 6, wherein the inpainting group setting unit calculates edge values of pixels within the reference region, determines whether a variation in edge values is below a preset reference variation, and groups the pixels within the reference region and sets the grouped pixels as the segmented reference region based on a result of the determination.

8. The inpainting device of claim 7, wherein the inpainting group setting unit determines whether the variation in edge values is below the preset reference variation, and groups the pixels within the reference region and sets the grouped pixels as the segmented reference region based on a result of the determination.

9. The inpainting device of claim 6, wherein the inpainting group setting unit determines whether the pixel values within the reference region fall within a preset range of values similar to a reference pixel value, and sets pixels falling within the similar range as an identical inpainting group.

10. The inpainting device of claim 6, wherein the inpainting group setting unit segments the target region using a pattern of a segmentation boundary line of the reference region.

11. An inpainting method using segmentation of a reference region, comprising:

determining an inpainting target region present within video image content and a reference region composed of pixels present within a preset distance from boundary pixels of the inpainting target region;

setting inpainting groups composed of respective pairs of segmented reference regions obtained by segmenting the reference region using pixel values within the reference region and segmented target regions obtained by segmenting the target region so as to correspond to the segmented reference region;

performing segmentation inpainting adapted to perform inpainting on a segmented target region using the segmented reference region on an inpainting group basis, and non-segmentation inpainting adapted to perform inpainting on the target region using the reference region; and visually providing a result of the segmentation inpainting, a result of the non-segmentation inpainting, and information about a difference between the results of the segmentation inpainting and the non-segmentation inpainting to the user, wherein setting the inpainting groups further comprises differently generating group sets based on a number of inpainting groups, and wherein generating the group sets comprises generating a first group set in which the number of inpainting groups has been set to a first number of segmentations and generating a second group set in which the number of inpainting groups has been set to a second number of segmentations different from the first number of segmentations.

12. The inpainting method of claim 11, wherein the segmentation inpainting comprises first segmentation inpainting adapted to be performed on the first group set and second segmentation inpainting adapted to be performed on the second group set.

13. The inpainting method of claim 12, wherein the result of the segmentation inpainting comprises results of the first segmentation inpainting and the second segmentation inpainting.

14. The inpainting method of claim 13, wherein providing the information about the difference comprises further visually displaying information about a difference between the results of the first segmentation inpainting and the second segmentation inpainting.

15. The inpainting method of claim 14, wherein generating the group sets comprises additionally generating the second group set in which the number of inpainting groups is equal to or smaller than a reference number of groups when a number of inpainting groups of the first group set exceeds the preset reference number of groups.

16. The inpainting method of claim 15, wherein generating the group sets comprises generating the second segmentation set by merging any two or more of the inpainting groups of the first group set when the first number of segmentations exceeds a preset reference number of segmentations.

17. A non-transitory computer-readable storage medium having stored thereon a program for executing an inpainting method using segmentation of a reference region, the method comprising:

determining an inpainting target region present within video image content and a reference region composed of pixels present within a preset distance from boundary pixels of the inpainting target region;

setting inpainting groups composed of respective pairs of segmented reference regions obtained by segmenting the reference region using pixel values within the reference region and segmented target regions obtained by segmenting the target region so as to correspond to the segmented reference region;

performing segmentation inpainting adapted to perform inpainting on a segmented target region using the segmented reference region on an inpainting group basis, and non-segmentation inpainting adapted to perform inpainting on the target region using the reference region; and visually providing a result of the segmentation inpainting a result of the non-segmentation inpainting, and information about a difference between the results of the segmentation inpainting and the non-segmentation inpainting to the user, wherein setting the inpainting groups further comprises differently generating group sets based on a number of inpainting groups, and wherein generating the group sets comprises generating a first group set in which the number of inpainting groups has been set to a first number of segmentations and generating a second group set in which the number of inpainting groups has been set to a second number of segmentations different from the first number of segmentations.

* * * * *